United States Patent
Cao

(10) Patent No.: US 9,340,297 B2
(45) Date of Patent: May 17, 2016

(54) COUNTER-FLOW GAS SEPARATION MODULES AND METHODS

(71) Applicant: The Boeing Company, Seal Beach, CA (US)

(72) Inventor: Tuan Q Cao, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 118 days.

(21) Appl. No.: 13/770,146

(22) Filed: Feb. 19, 2013

(65) Prior Publication Data

US 2014/0230649 A1    Aug. 21, 2014

(51) Int. Cl.
*B01D 53/22* (2006.01)
*B64D 37/32* (2006.01)

(52) U.S. Cl.
CPC ............... *B64D 37/32* (2013.01); *B01D 53/22* (2013.01); *B01D 2053/224* (2013.01); *B01D 2256/10* (2013.01); *B01D 2257/104* (2013.01); *B01D 2259/4575* (2013.01)

(58) Field of Classification Search
CPC ............ B64D 37/32; B01D 2053/224; B01D 2259/4575; B01D 2257/104; B01D 2311/10; B01D 2256/10; B01D 2311/103; B01D 63/02
USPC ............................ 95/43, 45, 47; 96/4, 7, 8, 10
See application file for complete search history.

(56) References Cited

U.S. PATENT DOCUMENTS

| | | | | |
|---|---|---|---|---|
| 2,734,592 A | * | 2/1956 | Jones | 96/8 |
| 3,446,594 A | * | 5/1969 | Buswell | C01B 3/24 252/373 |
| 3,550,355 A | * | 12/1970 | Remus et al. | 95/54 |
| 3,558,481 A | * | 1/1971 | furgerson | B01D 61/145 210/637 |
| 4,179,380 A | * | 12/1979 | Amicel et al. | 210/321.81 |
| 4,203,844 A | * | 5/1980 | Amicel et al. | 210/321.81 |
| 4,220,535 A | * | 9/1980 | Leonard | 210/321.89 |
| 4,508,548 A | * | 4/1985 | Manatt | 96/8 |
| 4,568,366 A | * | 2/1986 | Frederick et al. | 96/6 |
| 5,034,126 A | | 7/1991 | Reddy et al. | |
| 5,096,584 A | | 3/1992 | Reddy et al. | |

(Continued)

FOREIGN PATENT DOCUMENTS

JP    H06134246    5/1994

OTHER PUBLICATIONS

Machine Translation of JP 06-134246 May 17, 1994.*

(Continued)

*Primary Examiner* — Jason M Greene
*Assistant Examiner* — Anthony Shumate
(74) *Attorney, Agent, or Firm* — Parsons Behle & Latimer

(57) ABSTRACT

A gas separation method includes flowing a gas feed along a feed flow path within a housing directionally from a product end to a feed end of a gas separation membrane. After the feed flow path, the gas feed flows along a membrane flow path defined by the membrane from the feed end to the product end. The feed flow path is counter to the membrane flow path. Heat may be exchanged between the feed flow path and the membrane flow path and increase separation efficiency. Also, heat exchanged may compensate for some temperature drop in the membrane due to enthalpy of gas separation. A gas separation module includes a feed flow path within a housing extending directionally from a product end to a feed end of a membrane. The feed flow path is counter to a membrane flow path defined by the membrane.

20 Claims, 6 Drawing Sheets

(56) References Cited

U.S. PATENT DOCUMENTS

| | | | |
|---|---|---|---|
| 5,294,345 A | 3/1994 | Kaschemekat | |
| 5,411,662 A | 5/1995 | Nicolas, Jr. et al. | |
| 5,464,540 A * | 11/1995 | Friesen | B01D 61/362 210/640 |
| 5,468,283 A | 11/1995 | French et al. | |
| 5,711,882 A | 1/1998 | Hofmann et al. | |
| 5,762,685 A * | 6/1998 | Baker | B01D 53/229 95/288 |
| 5,840,098 A * | 11/1998 | Barbe | B01D 53/22 95/18 |
| 6,136,073 A | 10/2000 | Coan et al. | |
| 6,632,266 B2 * | 10/2003 | Thomas | B01D 53/22 95/49 |
| 6,740,140 B2 | 5/2004 | Giglia et al. | |
| 6,913,636 B2 | 7/2005 | Defrancesco | |
| 6,997,013 B2 | 2/2006 | Jones | |
| 7,081,153 B2 | 7/2006 | Leigh et al. | |
| 7,122,072 B2 * | 10/2006 | Carolan | B01D 53/22 204/252 |
| 7,152,635 B2 | 12/2006 | Moravec et al. | |
| 7,204,868 B2 | 4/2007 | Snow, Jr. | |
| 7,371,319 B2 * | 5/2008 | Wood | A61K 9/08 210/149 |
| 7,442,353 B1 * | 10/2008 | Richards | B01D 53/343 165/61 |
| 7,517,388 B2 | 4/2009 | Jensvold | |
| 7,922,780 B2 * | 4/2011 | Takamura | B01D 53/22 48/197 R |
| 8,167,143 B2 * | 5/2012 | Sirkar | B01D 61/364 210/321.79 |
| 8,252,090 B2 * | 8/2012 | Haggerty | B01D 53/047 95/138 |
| 8,349,905 B1 * | 1/2013 | Hwang | C08J 5/2256 429/429 |
| 8,721,766 B2 * | 5/2014 | Schirrmeister | B01D 53/22 95/43 |
| 8,778,062 B1 * | 7/2014 | Snow, Jr. | B64D 37/00 95/1 |
| 9,061,249 B2 * | 6/2015 | Evosevich | B01D 67/0067 |
| 9,186,628 B2 * | 11/2015 | Fautsch | B01D 63/021 |
| 9,227,160 B2 * | 1/2016 | Cao | B01D 63/022 |
| 2002/0162451 A1 | 11/2002 | Bikson et al. | |
| 2005/0204916 A1 * | 9/2005 | Falconer | B01D 53/228 95/51 |
| 2006/0248800 A1 * | 11/2006 | Miglin | B01B 1/005 48/198.7 |
| 2007/0100012 A1 * | 5/2007 | Beard | B01D 39/1692 521/99 |
| 2007/0157803 A1 * | 7/2007 | McNeil et al. | 95/45 |
| 2008/0035557 A1 * | 2/2008 | Partridge | B01D 61/362 210/500.23 |
| 2008/0167512 A1 * | 7/2008 | Sanders | B01D 53/226 585/818 |
| 2009/0320519 A1 * | 12/2009 | Gadre | B01D 53/002 62/606 |
| 2010/0213125 A1 * | 8/2010 | Fontalvo Alzate | B01D 61/362 210/638 |
| 2011/0077446 A1 * | 3/2011 | Shanbhag | B01D 53/226 585/818 |
| 2012/0040856 A1 * | 2/2012 | Alessi | B01L 3/5027 506/9 |
| 2013/0302882 A1 * | 11/2013 | Nishida | B01D 65/022 435/286.5 |
| 2014/0339152 A1 * | 11/2014 | Okabe | B01D 69/02 210/488 |
| 2015/0000523 A1 * | 1/2015 | Jojic | B01D 71/021 95/54 |
| 2015/0267611 A1 * | 9/2015 | Nemitallah | F02C 3/20 60/776 |
| 2015/0273387 A1 * | 10/2015 | Hayashi | B01D 53/22 96/7 |
| 2015/0360170 A1 * | 12/2015 | Evosevich | B01D 53/22 95/54 |

OTHER PUBLICATIONS

International Search Report and Written Opinion for PCT/US2014/010523; Patent Cooperation Treaty Apr. 3, 2014, 10 pages.

* cited by examiner

COUNTER-FLOW GAS SEPARATION MODULES AND METHODS

TECHNICAL FIELD

Devices and methods herein pertain to gas separation modules, including modules in aircraft fuel tank flammability reduction systems.

BACKGROUND

Known air separation modules (ASMs) are found in aircraft fuel tank flammability reduction systems. The ASM removes some oxygen from air to generate nitrogen-enriched air (NEA), which then flows into fuel tank ullage, a region in the tank that often contains evaporated fuel (such as, fuel vapor). The NEA may reduce flammability of the fuel tank ullage. Federal Aviation Administration (FAA) regulations require that new and in-service transport aircraft include systems for enhancing the safety of aircraft fuel tanks. Unfortunately, ASMs add weight to aircraft. Accordingly, decreased weight of air separation modules is desirable.

SUMMARY

A gas separation method includes using a gas separation module including a housing and a gas separation membrane within the housing. The gas separation membrane has a feed end and a product end with a retentate interior side and a permeate exterior side between the feed end and the product end. The method includes supplying a gas feed into the housing, the gas feed containing a first gas and different second gas. The gas feed flows along a feed flow path within the housing directionally from the product end to the feed end of the gas separation membrane. The gas feed is segregated from contact with the permeate exterior side.

After the feed flow path, the gas feed flows along a membrane flow path defined by the gas separation membrane from the feed end to the product end of the gas separation membrane. The feed flow path is counter to the membrane flow path. The method also includes contacting the retentate interior side with the gas feed in the membrane flow path, permeating at least some of the first gas from the gas feed through the gas separation membrane to the permeate exterior side, and producing retentate that is enriched in the second gas as a result of removing at least some of the first gas from the gas feed.

By way of example, the method may include exchanging heat between the feed flow path and the membrane flow path as enabled by the feed flow path being counter to the membrane flow path and, as a result, increasing a separation efficiency of the gas separation module. The method may further include providing a configuration for the gas separation module, selecting one or more process conditions, and, as a result, compensating for at least a portion of a temperature drop in the gas separation membrane due to enthalpy of gas separation. A temperature of the product end of the gas separation membrane may be established within 10° F. of a temperature of the feed end of the gas separation membrane.

A gas separation module includes a housing having a feed port enabling inlet of gas feed, a permeate port enabling outlet of permeate, and a retentate port enabling outlet of retentate. The module includes a gas separation membrane within the housing, the gas separation membrane having a feed end and a product end with a retentate interior side and a permeate exterior side between the feed end and the product end. A feed flow path is within the housing and extends directionally from the product end to the feed end of the gas separation membrane and is segregated from contact with the permeate exterior side. The feed flow path is counter to a membrane flow path defined by the gas separation membrane and extending from the feed end to the product end of the gas separation membrane enabling contact with the retentate interior side.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some devices and methods are described below with reference to the following accompanying drawings.

DETAILED DESCRIPTION

Some known gas separation modules use hollow fiber membranes (HFMs). HFMs may include a fiber wall of a permeable, porous material supporting a thin membrane or skin thereon of a different material providing selectivity in the gas separation process. Such HFMs are referred to as composite membranes given the different materials included. HFMs that are not composite may include a skin using the same material as the porous support and may be referred to as asymmetric membranes, given the varying transport properties across the HFM thickness. Although a focus on hollow fiber membranes exists for gas separation processes, other types of gas separation membranes might be used in the devices and methods herein.

During operation of the gas separation module, gas feed enters a feed end of the fibers and selected gasses diffuse through fiber walls to produce permeate. Retained gasses proceed down the hollow fibers to the product end and exit as retentate. Both ends of the hollow fiber membranes may be potted with resin to secure the fibers. The potted resin securing the fiber ends forms tubesheets at each end that segregate the gas feed and the retentate from the permeate. The combination of the fibers and tubesheets forms an element that may be inserted in a shell to form the module. Some may be refer to the element as a "cartridge" and to the shell as a "canister." However, in the present document, the meaning of "element" and "shell" are not limited to the respective ordinary meanings of "cartridge" and "canister." Generally, the potted resin forms a plug with a circular perimeter around the respective fiber ends fitted within a tube-shaped shell. Even so, the configurations herein include additional geometries for tubesheets and shells.

For some applications in which a gas separation module is used, such as a fuel tank flammability reduction system, gas feed may be supplied at an elevated temperature. For separation of oxygen from air, and for other gas pairs, separation efficiency may increase with increased temperature of gas feed. Beneficially, a readily available gas source might supply heated gas as a byproduct of an unrelated process. In aircraft, engine bleed air is a known source for gas feed to an air separation module and often reaches the air separation module at 160° F. to 300° F.

Figure 5:
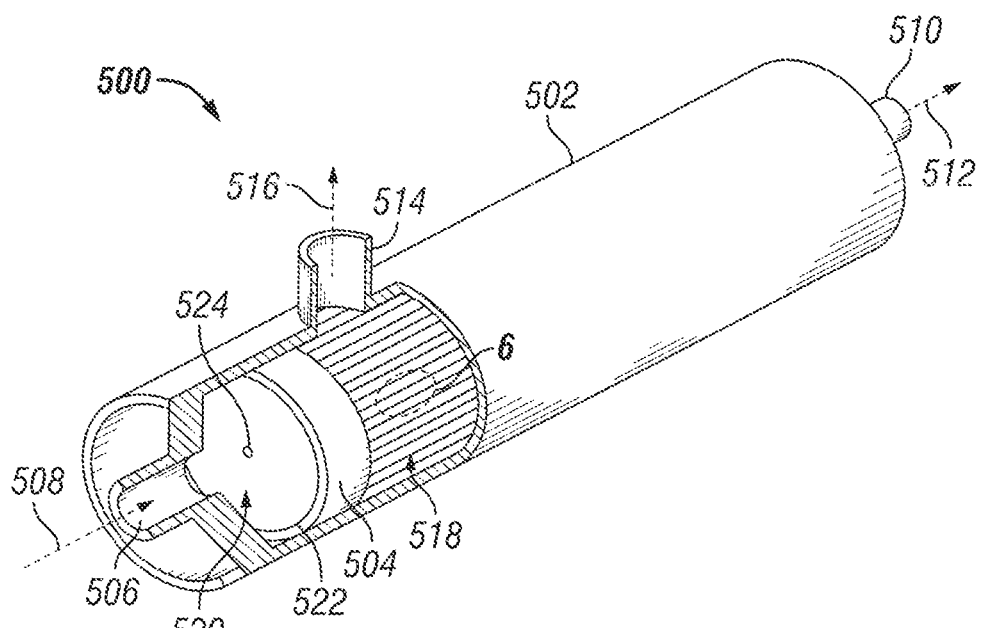
FIGS. 5 and 6 are isometric and close-up views, respectively, of a prior art gas separation module.
Figure 6:
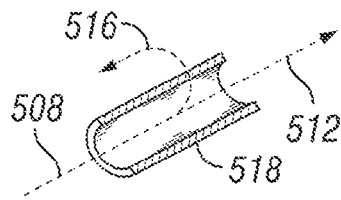

FIGS. 5 and 6 show a known gas separation module 500 including a shell 502 in which element 520 is installed. A feed port 506 allows entry of a gas feed 508 to contact tubesheet 522 and enter fibers 518 assembled around a support 524. A rim 504 around tubesheet 522 is provided to seal tubesheet 522 within shell 502. Consequently, gas feed 508 flows into an individual fiber 518 (shown in FIG. 6) to produce permeate 516, which passes through the wall of individual fiber 518. Retentate 512 exits individual fiber 518 at another tubesheet (not shown in FIG. 5) and flows through a retentate port 510. Permeate 516 from each of fibers 518 collects between tubesheet 522 and the other tubesheet and flows through permeate port 514.

The temperature along fibers 518 in the known flow-through design shown in FIGS. 5 and 6 decreases as gas feed 508 flows downstream from tubesheet 522 to the other tubesheet (not shown). The temperature profile may depend on the flow rate of gas feed 508 and may drop up to 50° F., or even 70° F., from tubesheet 522 to the other tubesheet. The cooling may be partly due to the enthalpy of separation of gases associated with one gas permeating preferentially through the membranes of fibers 518 to produce permeate 516 and retentate 512. Also, the cooling may be partly due to a pressure drop as gas feed 508 flows down the length of fibers 518. Because the efficiency of gas separation through a membrane decreases with decreasing temperature, the decreasing temperature profile along fibers 518 likewise reduces separation efficiency along fibers 518, yielding a related decreasing profile for separation efficiency.

Expected separation efficiency represents one factor in sizing a gas separation module. As the separation efficiency decreases, module size, and thus module weight, may increase to provide a suitable amount of retentate flow despite a decreased efficiency. Consequently, an opportunity to decrease gas separation module weight exists in increasing separation efficiency. The amount of retentate produced by a gas separation module may be increased by establishing a temperature profile along fibers 518 that does not drop as significantly as described above. The overall separation efficiency of a gas separation module may increase when the temperature drop is reduced; that is, if temperature at the other tubesheet (not shown) downstream increases to a temperature closer to that at tubesheet 522.

One possibility for increasing gas separation efficiency includes exchanging heat between gas feed and a gas separation membrane. A gas separation method includes using a gas separation module including a housing and a gas separation membrane within the housing. The gas separation membrane has a feed end and a product end with a retentate interior side and a permeate exterior side between the feed end and the product end. The method includes supplying a gas feed into the housing, the gas feed containing a first gas and different second gas. The gas feed flows along a feed flow path within the housing directionally from the product end to the feed end of the gas separation membrane. The gas feed is segregated from contact with the permeate exterior side.

After the feed flow path, the gas feed flows along a membrane flow path defined by the gas separation membrane from the feed end to the product end of the gas separation membrane. The feed flow path is counter to the membrane flow path. The method also includes contacting the retentate interior side with the gas feed in the membrane flow path, permeating at least some of the first gas from the gas feed through the gas separation membrane to the permeate exterior side, and producing retentate that is enriched in the second gas as a result of removing at least some of the first gas from the gas feed.

By way of example, the gas separation module may be an air separation module included in an aircraft fuel tank flammability reduction system. The gas feed is then an air feed, the first gas is oxygen, and the second gas is nitrogen. Consequently, the method may further include supplying the retentate, which contains nitrogen-enriched air, to a fuel tank on board the aircraft.

The method may further include exchanging heat between the feed flow path and the membrane flow path as enabled by the feed flow path being counter to the membrane flow path. The concept and benefits of counter-current heat transfer between a hot fluid and a cold fluid to increase heat exchange efficiency is known in the context of counter-current heat exchangers. However, in counter-current heat exchangers, such as shell-and-tube heat exchangers, a hot fluid contacts a tube containing a different cold fluid to heat the cold fluid.

In contrast, the present method includes a hot fluid (gas feed) heating a downstream flow of the same fluid inside the gas separation module to counteract internal cooling caused by processing inside the module. Also, in contrast, the gas feed is segregated from contact with the permeate exterior side of the gas separation membrane. Accordingly, the hot fluid (gas feed) does not contact the tube (gas separation membrane) containing the cold fluid.

The method may include establishing a temperature of the product end of the gas separation membrane that is within 10° F. of a temperature of the feed end of the gas separation membrane. As flow rate increases, the product end temperature may increase to more closely approach the feed end temperature. Consequently, the method may include providing a configuration for the gas separation module, selecting one or more process conditions (such as flow rate), and, as a result, compensating for at least a portion of a temperature drop in the gas separation membrane due to enthalpy of gas separation.

Using the feed flow path counter to the membrane flow path may raise the product end temperature for a wide range of gas feed flow rate. At lower flow rates, though product end temperature may increase, the temperature profile along the membrane may be less uniform in comparison to the temperature profile at higher flow rates. Lower flow rates may allow more drop in temperature between the feed end and the product end followed by a temperature rise at the product end. Higher flow rates may allow less drop in temperature between the feed end and the product end, increasing temperature uniformity. Since the increased temperature may be established along more of the membrane, separation efficiency may further increase at higher flow rates.

The housing may include an inner shell and an outer shell, the gas separation membrane may be within the inner shell, and flowing the gas feed along the feed flow path may include flowing the gas feed along a passage between the inner shell and the outer shell. Flowing the gas feed along the feed flow path or flowing the gas feed along the membrane flow path or both may include flowing the gas feed along a plurality of separated flow paths.

The gas separation membrane may include a plurality of hollow fiber membranes; the gas separation module may include a feed tubesheet within the housing securing the feed end of the fibers and a product tubesheet within the housing securing the product end of the fibers. As a result, the method may further include segregating the gas feed and the permeate exterior side of the fibers with the feed tubesheet and segregating the permeate exterior side of the fibers and the retentate with the product tubesheet. Additionally, the feed flow path may extend among the fibers and the method may further include segregating the feed flow path from contact with the permeate exterior side.

Figure 1A:
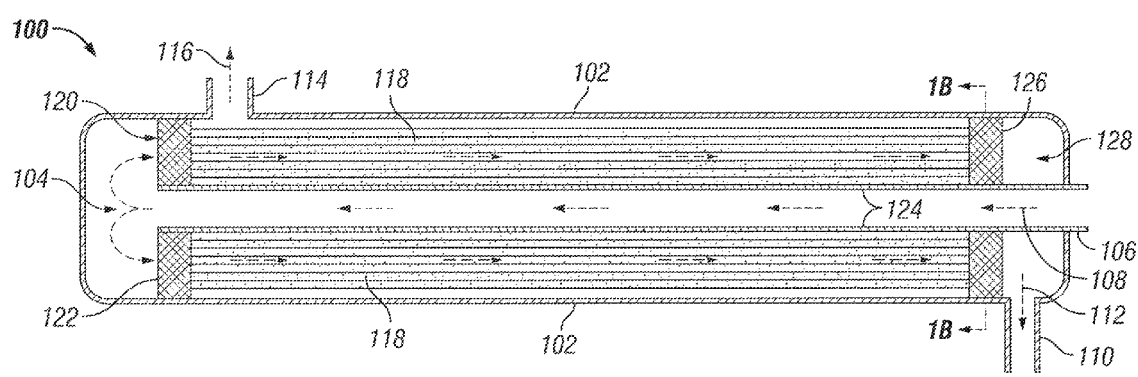
FIGS. 1A-4C are cross-sectional views of counter-feed gas separation modules according to several configurations.
Figure 1B:
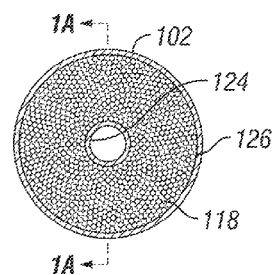

FIGS. 1A and 1B show a gas separation module 100 that may be used to implement the methods described herein. Gas separation module 100 includes a shell 102 having a feed port 106 that enables inlet of a gas feed 108. Gas feed 108 flows through a support 124 that extends from a product tubesheet 126 to a feed tubesheet 122. Gas feed 108 flows into a header 104 associated with feed tubesheet 122. Gas feed 108 then flows into the feed end of fibers 118 at feed tubesheet 122. Gas separation module 100 thus provides a feed flow path among fibers 118, but is segregated from a permeate side of fibers 118 by support 124.

Fibers 118 and tubesheets 122 and 126 in combination form an element 120 within shell 102. Selected gases of gas feed 108 flow through element 120 via fibers 118 and permeate through fibers 118 to produce a permeate 116. Permeate 116 collects between feed tubesheet 122 and product tubesheet 126 and exits through permeate port 114. Gases remaining in fibers 118 flow out the product end of fibers 118 at product tubesheet 126 and into a header 128 to provide a retentate 112, which exits through a retentate port 110.

It will be appreciated that gas separation module 100 also provides a membrane flow path defined by fibers 118 and extending from the feed end to the product end of such fibers. Consequently, FIG. 1A shows a feed flow path that is counter to a membrane flow path. The counter feed arrangement of gas flow through gas separation module 100 enables heat exchange between the feed flow path and the membrane flow path. As a result, a temperature of the product end of fibers 118 may increase to a temperature that is closer to a temperature of the feed end of fibers 118. A temperature drop along fibers 118 may be reduced compared to a temperature drop in the known flow-through design shown in FIGS. 5 and 6. The overall separation efficiency of gas separation module 100 may increase when the temperature drop is reduced. Also, a temperature profile within element 120 may have increased uniformity, depending on gas feed 108 flow rate, and further increase separation efficiency.

Figure 2A:
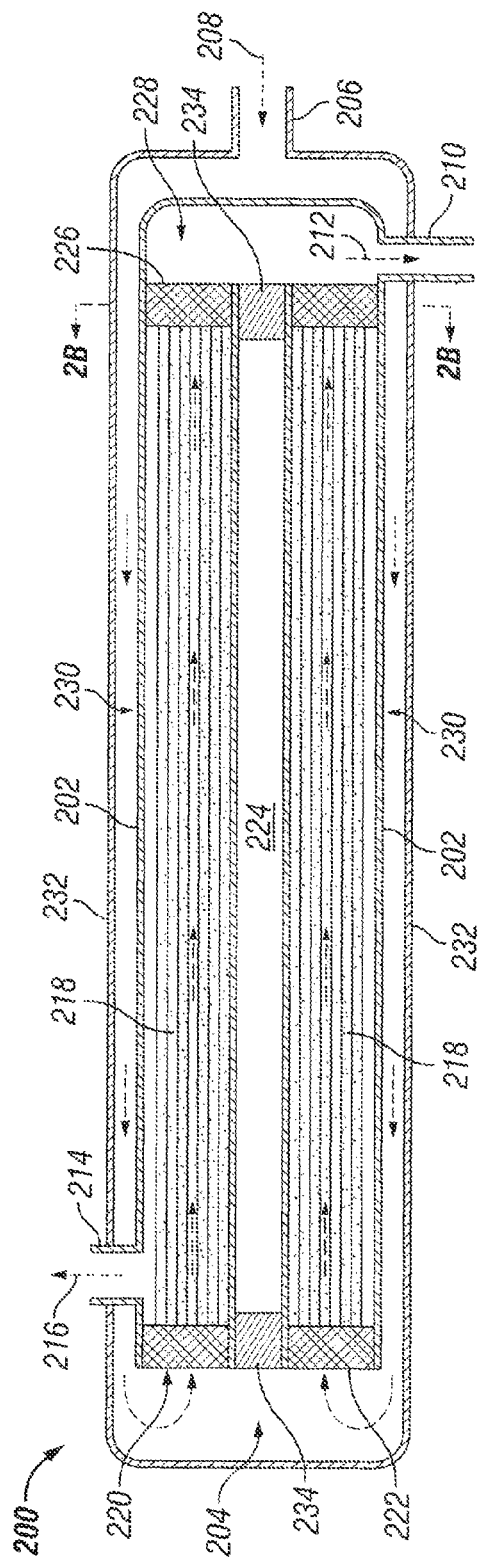
Figure 2B:
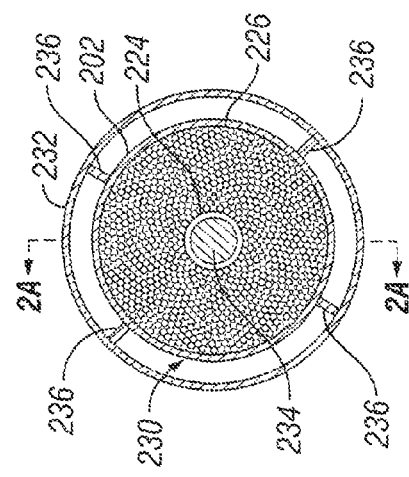

FIGS. 2A and 2B show a gas separation module 200 that may also be used to implement the methods described herein. Gas separation module 200 includes a shell 232 having a feed port 206 that enables inlet of a gas feed 208. Gas feed 208 flows around a shell 202 within shell 232 and flows into a passage 230 between shell 232 and shell 202. Spacers 236 (FIG. 2B) support shell 202 within shell 232 and may extend the length of shell 202 or some portion thereof. After flowing down passage 230, gas feed 208 flows into a header 204 associated with a feed tubesheet 222. Gas feed 208 then flows into the feed end of fibers 218 at feed tubesheet 222.

A support 224 is provided in an element 220 that includes feed tubesheet 222, a product tubesheet 226, and fibers 218 extending there between. Gas separation module 200 thus provides a feed flow path that is segregated from a permeate side of fibers 218 by shell 202. Although support 224 is hollow, plugs 234 are inserted at feed tubesheet 222 and product tubesheet 226 to keep gas from flowing through support 224. The hollow nature of support 224 may reduce the weight of gas separation module 200.

Selected gases of gas feed 208 flow through element 220 via fibers 218 and permeate through fibers 218 to produce a permeate 216. Permeate 216 collects between feed tubesheet 222 and product tubesheet 226 and exits through permeate port 214. Gases remaining in fibers 218 flow out the product end of fibers 218 at product tubesheet 226 and collect in a header 228 to provide a retentate 212, which exits through a retentate port 210. It will be appreciated that gas separation module 200 also provides a membrane flow path defined by fibers 218 and extending from the feed end to the product end of such fibers. Consequently, FIG. 2A shows a feed flow path that is counter to a membrane flow path. The counter feed arrangement enables heat exchange between the feed flow path and the membrane flow path.

As a result, a temperature of the product end of fibers 218 may increase to a temperature that is closer to a temperature of the feed end of fibers 218. A temperature drop along fibers 218 may be reduced compared to a temperature drop in the known flow-through design shown in FIGS. 5 and 6. The overall separation efficiency of gas separation module 200 may increase when the temperature drop is reduced. Also, a temperature profile within element 220 may have increased uniformity, depending on gas feed 208 flow rate, and further increase separation efficiency.

Figure 3A:
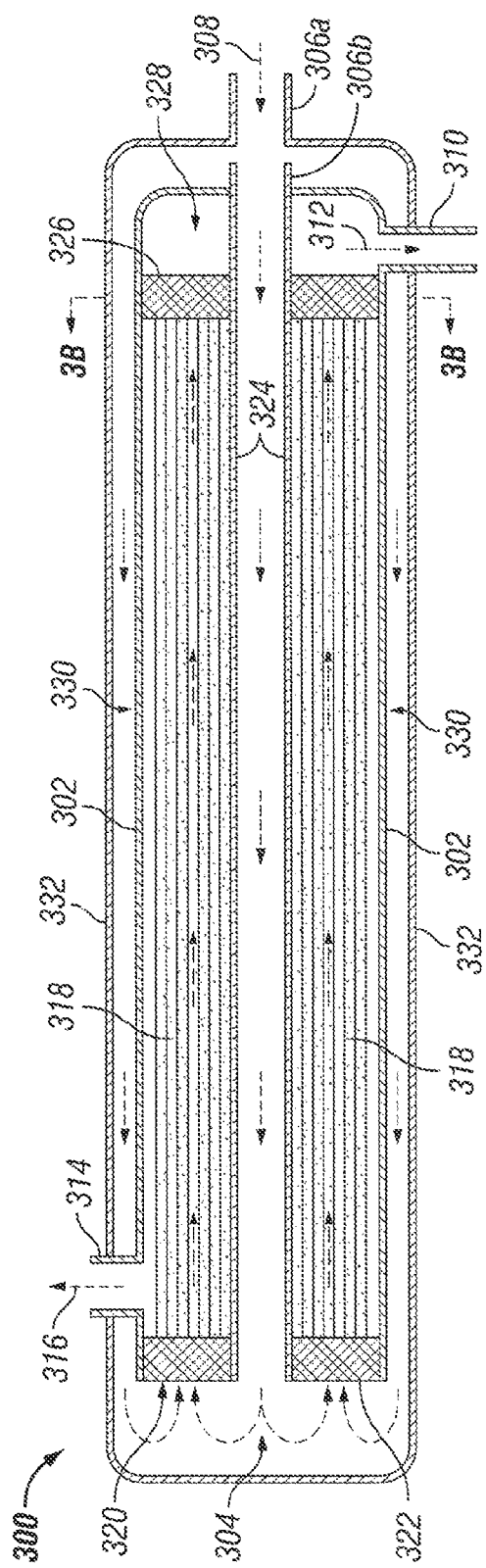
Figure 3B:
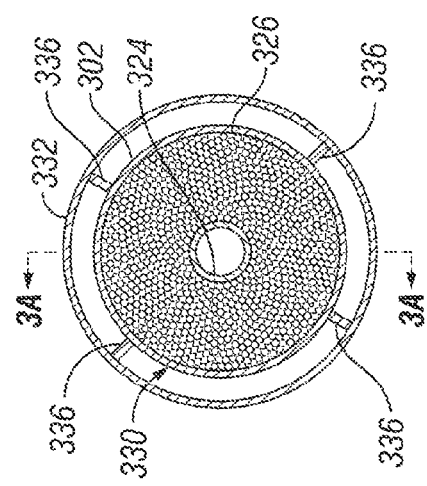

FIGS. 3A and 3B show a gas separation module 300 that combines the features of gas separation modules 100 and 200. Gas separation module 300 in FIGS. 3A and 3B may also be used to implement the methods described herein. Gas separation module 300 includes a shell 332 having a feed port 306a that enables inlet of a gas feed 308. Gas feed 308 flows around a shell 302 within shell 332 and into a passage 330 between shell 332 and shell 302. Spacers 336 (FIG. 3B) support shell 302 within shell 332 and may extend the length of shell 302 or some portion thereof. After flowing down passage 330, gas feed 308 flows into a header 304 associated with a feed tubesheet 322. Gas feed 308 then flows into the feed end of fibers 318 at feed tubesheet 322. Gas separation module 300 also includes a feed port 306b that enables inlet of gas feed 308 into a support 324, which extends from a product tubesheet 326 to feed tubesheet 322. Support 324 also connects with feed port 306b or integrally includes feed port 306b to receive gas feed 308, which flows into header 304.

An element 320 includes feed tubesheet 322, product tubesheet 326, support 324, and fibers 318. Gas separation module 300 thus provides a feed flow path that is segregated from a permeate side of fibers 318 by shell 302. Gas separation module 300 also provides a feed flow path among fibers 318 that is segregated from the permeate side of fibers 318 by support 324.

Selected gases of gas feed 308 flow through element 320 via fibers 318 and permeate through fibers 318 to produce a permeate 316. Permeate 316 collects between feed tubesheet 322 and product tubesheet 326 and exits through permeate port 314. Gases remaining in fibers 318 flow out the product end of fibers 318 at product tubesheet 326 and collect in a header 328 to provide a retentate 312, which exits through a retentate port 310. It will be appreciated that gas separation module 300 also provides a membrane flow path defined by fibers 318 and extending from the feed end to the product end of such fibers. Consequently, FIG. 3A shows a feed flow path that is counter to a membrane flow path. The counter feed arrangement enables heat exchange between the feed flow path and the membrane flow path.

As a result, the product end of fibers 318 may increase to a temperature that is closer to a temperature of the feed end of fibers 318. A temperature drop along fibers 318 may be reduced compared to a temperature drop in the known flow-through design shown in FIGS. 5 and 6. The overall separation efficiency of gas separation module 300 may increase when the temperature drop is reduced. Also, a temperature profile within element 320 may have increased uniformity, depending on gas feed 308 flow rate, and further increase separation efficiency.

Figure 4A:
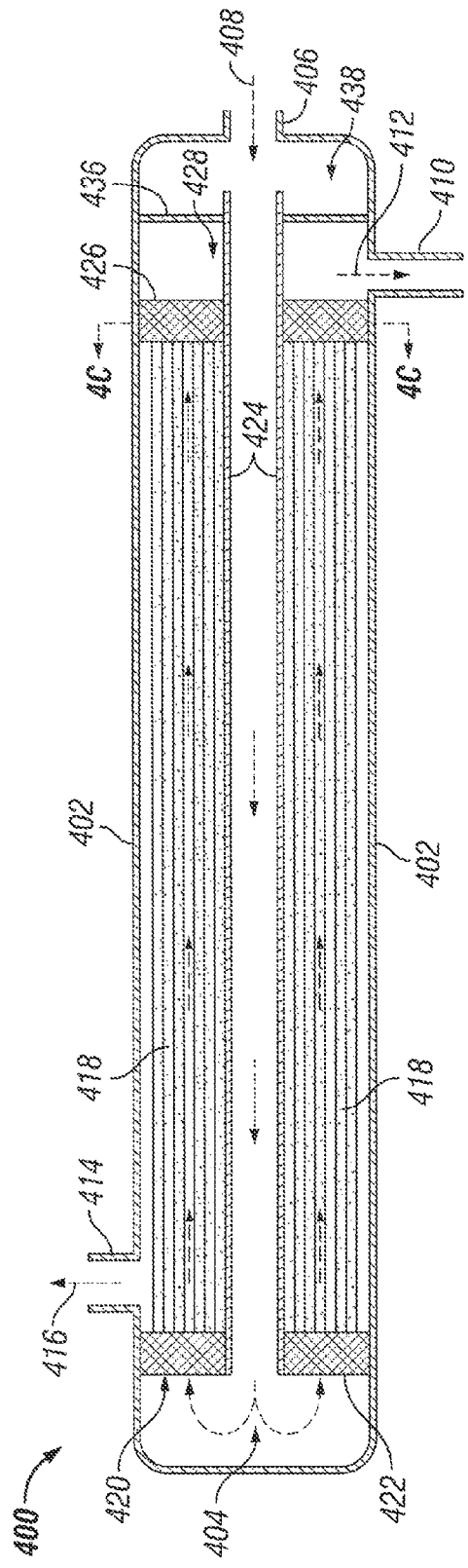
Figure 4B:
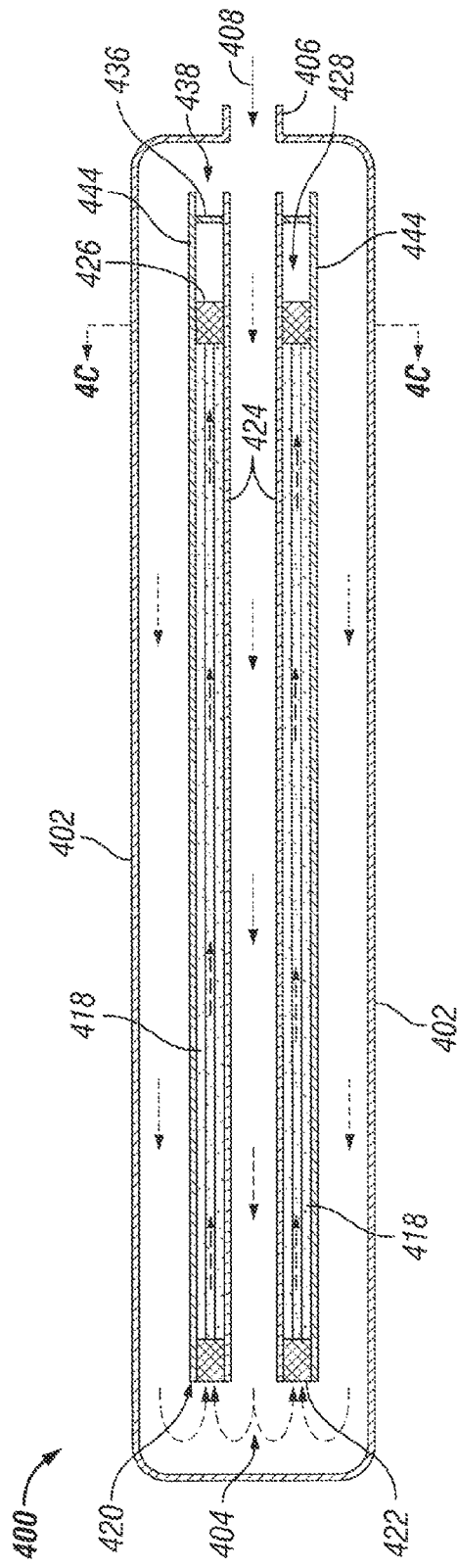
Figure 4C:
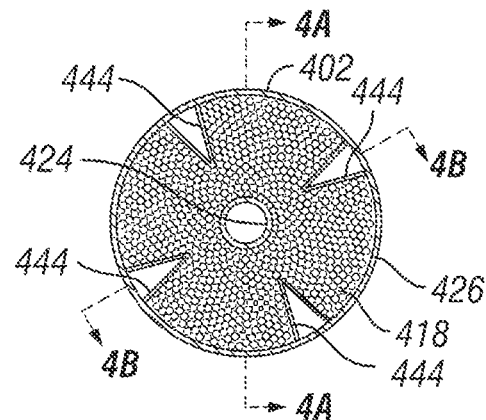

FIGS. 4A, 4B, and 4C show a gas separation module 400 that may be used to implement the methods described herein. Gas separation module 400 includes a shell 402 having a feed port 406 that enables inlet of a gas feed 408 into a header 438 between shell 402 and an interior wall 436. Gas feed 408 flows through a support 424 that extends from a product tubesheet 426 to a feed tubesheet 422. Support 424 also extends through wall 436 to receive gas feed 408, which flows from header 438 into a header 404 associated with feed tubesheet 422. Gas feed 408 then flows into the feed end of fibers 418 at feed tubesheet 422. Gas separation module 400 thus provides a feed flow path among fibers 418, but is segregated from a permeate side of fibers 418 by support 424.

In addition to support 424, gas separation module 400 further includes conduits 444. Gas feed 408 flows through conduits 444 that extend from product tubesheet 426 to feed tubesheet 422. Conduits 444 also extend through wall 436 to receive gas feed 408, which flows from header 438 into header 404. Gas feed 408 then flows into the feed end of fibers 418. Gas separation module 400 thus provides an additional feed flow path among fibers 418, but is segregated from a permeate side of fibers 418 by conduit 444.

Fibers 418 and tubesheets 422 and 426 in combination form an element 420 within shell 402. Selected gases of gas feed 408 flow through element 420 via fibers 418 and permeate through fibers 418 to produce a permeate 416. Permeate 416 collects between feed tubesheet 422 and product tubesheet 426 and exits through permeate port 414. Gases remaining in fibers 418 flow out the product end of fibers 418 at product tubesheet 426 and into a header 428 between product tubesheet 426 and wall 436 to provide a retentate 412, which exits through a retentate port 410.

It will be appreciated that gas separation module 400 also provides a membrane flow path defined by fibers 418 and extending from the feed end to the product end of such fibers. Consequently, FIGS. 4A and 4B show a feed flow path that is counter to a membrane flow path. The counter feed arrangement of gas flow through gas separation module 400 enables heat exchange between the feed flow path and the membrane flow path. As a result, the product end of fibers 418 may increase to a temperature that is closer to a temperature of the feed end of fibers 418. A temperature drop along fibers 418 may be reduced compared to a temperature drop in the known flow-through design shown in FIGS. 5 and 6. The overall separation efficiency of gas separation module 400 may increase when the temperature drop is reduced. Also, a temperature profile within element 420 may have increased uniformity, depending on gas feed 408 flow rate, and further increase separation efficiency.

Conduits 444 are in a V-shape, but other geometries are conceivable. Each of the four conduits 444 shown in FIG. 4C may have an arc length at the periphery of product tubesheet 426 that encompasses about 2% of the tubesheet circumference, for a total of 8% of the circumference. Conduits 444 may extend from more than one-half to about two-thirds of the radius of tubesheets 422 and 426 to allow for heat transfer area. By spacing conduits 444 around support 424, heat from gas feed 408 may be distributed more efficiently among fibers 418. A design for a gas separation module may account for the loss of flow through element 420 due to replacing some of fibers 418 with conduits 444. Flow loss may be balanced against the gain in retentate production from increased separation efficiency due to a temperature increase at the product end of fibers 418.

Known techniques for forming a gas separation module may include winding a fiber material onto the support. Known techniques for winding fiber material onto a support, including spiral and diagonal winding, may be used with accommodation for any conduits by also winding fiber material onto the conduits or leaving a space where conduits may be inserted. As an alternative for straight winding, not diagonal or spiral, slots may be machined into feed and product tubesheets and conduits inserted in the slots among the fibers. Although fiber material is often wound onto supports, known module designs exist that do not include a support. Nevertheless, conduits may be inserted later by machining a space in tubesheets or leaving a space using other techniques.

Supports 124, 324, and 424, conduits 444, and passages 230 and 330 that provide feed flow paths are shown as hollow in the Figures. However, they may instead be partially or fully filled with porous material that allows gas flow through the porous material. The porous material may provide structural support to the supports, conduits, and passages. Low density, open cell, metal foams may be used. An example of low density foam includes foam having a density of less than 15 pounds per cubic foot ($lb/ft^3$), such as 8-15 $lb/ft^3$. An example of metal foam includes aluminum foam. A metallic honeycomb may be used as the porous material and provide structural support as well as enhanced heat transfer with minimal pressure loss. The metallic honeycomb may have a density of 3-6 $lb/ft^3$.

It will be appreciated that yet further gas separation modules may be used to implement the methods described herein. Even though gas separation modules 100, 200, 300, and 400 in the Figures have a circular cross-section, other geometries for the respective shells and elements are conceivable. Accordingly, a gas separation module includes a housing having a feed port enabling inlet of gas feed, a permeate port enabling outlet of permeate, and a retentate port enabling outlet of retentate. The module includes a gas separation membrane within the housing, the gas separation membrane having a feed end and a product end with a retentate interior side and a permeate exterior side between the feed end and the product end. A feed flow path is within the housing and extends directionally from the product end to the feed end of the gas separation membrane and is segregated from contact with the permeate exterior side. The feed flow path is counter to a membrane flow path defined by the gas separation membrane and extending from the feed end to the product end of the gas separation membrane enabling contact with the retentate interior side.

By way of example, the feed flow path counter to the membrane flow path may enable heat exchange between the feed flow path and the membrane flow path. The gas separation module may be an air separation module comprised by an aircraft fuel tank flammability reduction system. The system may include a source for air to the feed port and a fuel tank on board the aircraft to receive the retentate, which contains nitrogen-enriched air.

The housing may include at least one additional port selected from the group consisting of an additional feed port, an additional permeate port, and an additional retentate port. The housing may include an inner shell and an outer shell, the gas separation membrane being within the inner shell, and a passage between the inner shell and the outer shell defining at least part of the feed flow path. The passage may have a first end in fluid communication with the feed port and a second end in fluid communication with the feed end of the gas separation membrane, the inner shell segregating the feed flow path from contact with the permeate exterior side of the gas separation membrane.

The feed flow path or the membrane flow path or both may include a plurality of separated flow paths. The feed flow path may be defined in part by at least one support for the gas separation membrane, the at least one support being selected from the group consisting of a hollow support and a porous support.

The gas separation membrane may include a plurality of hollow fiber membranes. The gas separation module may further include a feed tubesheet within the housing securing the feed end of the fibers and enabling segregation of the gas feed and the permeate exterior side of the fibers. The gas separation module may still further include a product tubesheet within the housing securing the product end of the fibers and enabling segregation of the permeate exterior side of the fibers and the retentate. The feed flow path may extend among the fibers, but be segregated from contact with the permeate exterior side. The feed flow path may be defined in part by a conduit extending among the fibers, having a first end secured by the product tubesheet, and having a second end secured by the feed tubesheet. The first end may be in fluid communication with the feed port, the conduit segregating the feed flow path from contact with the permeate exterior side of the fibers, and the second end may be in fluid communication with the feed end of the fibers. The conduit may include a plurality of separated conduits.

Figure 7:
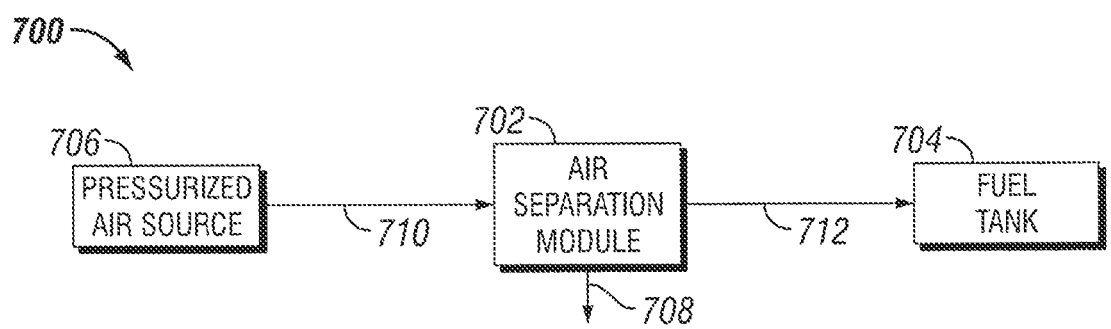
FIG. 7 shows a fuel tank flammability reduction system.

FIG. 7 shows a system 700 with an ASM 702 that may include the gas separation modules described herein. An air source 706 may be pressurized, as shown in FIG. 7, or at ambient pressure. Even so, separation efficiency often increases with increasing pressure, as in the case of hollow fiber membrane production of nitrogen-enriched air. Air source 706 provides air feed 710 to ASM 702, which produces permeate 708 and nitrogen-enriched air 712. A fuel tank 704 enables receipt of nitrogen-enriched air 712 to reduce flammability of fuel tank ullage. ASM 702 may offer the benefits of the methods and devices described herein.

In compliance with the statute, the devices and methods have been described in language more or less specific as to structural and methodical features. It is to be understood, however, that the devices and methods are not limited to the specific features shown and described. The devices and methods are, therefore, claimed in any of their forms or modifications within the proper scope of the appended claims appropriately interpreted in accordance with the doctrine of equivalents.

TABLE OF REFERENCE NUMERALS FOR FIGURES 100 module
102 shell
104 header
106 feed port
108 feed
110 retentate port
112 retentate
114 permeate port
116 permeate
118 fiber(s)
120 element
122 feed tubesheet
124 support
126 product tubesheet
128 header
200 module
202 shell
204 header
206 feed port
208 feed
210 retentate port
212 retentate
214 permeate port
216 permeate
218 fiber(s)
220 element
222 feed tubesheet
224 support
226 product tubesheet -continued

TABLE OF REFERENCE NUMERALS FOR FIGURES 228 header
230 passage
232 shell
234 plug
236 spacer
300 module
302 shell
304 header
306a feed port
306b feed port
308 feed
310 retentate port
312 retentate
314 permeate port
316 permeate
318 fiber(s)
320 element
322 feed tubesheet
324 support
326 product tubesheet
328 header
330 passage
332 shell
336 spacer
400 module
402 shell
404 header
406 feed port
408 feed
410 retentate port
412 retentate
414 permeate port
416 permeate
418 fiber(s)
420 element
422 feed tubesheet
424 support
426 product tubesheet
428 header
436 wall
438 header
444 conduit
500 module
502 shell
504 rim
506 feed port
508 feed
510 retentate port
512 retentate
514 permeate port
516 permeate
518 fiber(s)
520 element
522 feed tubesheet
524 support
700 system
702 ASM
704 fuel tank
706 air source
708 permeate
710 air feed
712 nitrogen-enriched air

What is claimed is:

1. A gas separation method comprising:
using an air separation module of an aircraft fuel tank flammability reduction system, the air separation module including a housing and a gas separation membrane within the housing, the gas separation membrane having a feed end and a product end with a retentate interior side and a permeate exterior side between the feed end and the product end;
supplying an air feed into the housing, the air feed containing oxygen gas and nitrogen gas;

flowing the air feed along a feed flow path within the housing directionally from the product end to the feed end of the gas separation membrane, the air feed being segregated from contact with the permeate exterior side;

after the feed flow path, flowing the air feed along a membrane flow path defined by the gas separation membrane from the feed end to the product end of the gas separation membrane, the feed flow path being counter to the membrane flow path;

contacting the retentate interior side with the air feed in the membrane flow path, permeating at least some of the oxygen gas from the air feed through the air separation membrane to the permeate exterior side, and producing retentate that is enriched in the nitrogen gas as a result of removing at least some of the oxygen gas from the air feed;

exchanging heat between the membrane flow path and the feed flow path counter to the membrane flow path and reducing a temperature drop along the membrane flow path compared to an arrangement with a feed flow path concurrent with the membrane flow path;

providing a configuration for the air separation module, selecting one or more process conditions, and, as a result, establishing a temperature of the product end of the gas separation membrane that is within 10° F. of a temperature of the feed end of the gas separation membrane, the established temperature of the product end increasing a separation efficiency of the air separation module compared to when the temperature of the product end is more than 10° F. below the temperature of the feed end; and supplying the retentate, which contains nitrogen-enriched air, to a fuel tank on board the aircraft.

2. The method of claim 1 further comprising flowing the air feed along another feed flow path directionally from the product end to the feed end of the gas separation membrane, the other feed flow path being separated from the feed flow path, the air feed in the other feed flow path contacting the housing and, thereafter, flowing inside the hollow fiber membranes along the membrane flow path, and the other feed flow path being counter to the membrane flow path.

3. The method of claim 1 wherein the feed flow path is at least partially filled with structurally supportive porous material that allows gas flow through the porous material.

4. The method of claim 1 wherein establishing the temperature of the product end of the gas separation membrane within 10° F. of the temperature of the feed end of the gas separation membrane comprises compensating for at least a portion of the temperature drop in the gas separation membrane due to enthalpy of gas separation by increasing air feed flow rate compared to when the temperature of the product end is more than 10° F. below the temperature of the feed end and thus increasing the temperature of the product end of the gas separation membrane compared to when the temperature of the product end is more than 10° F. below the temperature of the feed end.

5. The method of claim 1 wherein the housing comprises an inner shell and an outer shell, the gas separation membrane is within the inner shell, and flowing the air feed along the feed flow path comprises flowing the air feed along a passage between the inner shell and the outer shell.

6. The method of claim 1 wherein flowing the air feed along the feed flow path or flowing the air feed along the membrane flow path or both comprise flowing the air feed along a plurality of separated flow paths.

7. The method of claim 1 wherein the gas separation membrane comprises a plurality of hollow fiber membranes, the gas separation module comprises a feed tubesheet within the housing securing the feed end of the plurality of hollow fiber membranes and a product tubesheet within the housing securing the product end of the plurality of hollow fiber membranes, and the method further comprises:

segregating the air feed and the permeate exterior side of the plurality of hollow fiber membranes with the feed tubesheet; and segregating the permeate exterior side of the plurality of hollow fiber membranes and the retentate with the product tubesheet.

8. The method of claim 7 wherein the feed flow path extends among the plurality of hollow fiber membranes.

9. A gas separation method comprising:

using an air separation module of an aircraft fuel tank flammability reduction system, the air separation module including a housing and a gas separation membrane within the housing, the gas separation membrane having a feed end and a product end with a retentate interior side and a permeate exterior side between the feed end and the product end and including a plurality of hollow fiber membranes;

supplying an air feed into the housing, the air feed containing oxygen gas and nitrogen gas;

flowing the air feed along a feed flow path within the housing directionally from the product end to the feed end of the gas separation membrane, the feed flow path extending among and being surrounded by the plurality of hollow fiber membranes and the air feed being segregated from contact with the permeate exterior side;

after the feed flow path, flowing the air feed inside the hollow fiber membranes along a membrane flow path defined by the gas separation membrane from the feed end to the product end of the gas separation membrane, the feed flow path being counter to the membrane flow path;

contacting the retentate interior side with the air feed in the membrane flow path, permeating at least some of the oxygen gas from the air feed through the gas separation membrane to the permeate exterior side, and producing retentate that is enriched in the nitrogen gas as a result of removing at least some of the oxygen gas from the air feed;

exchanging heat between the membrane flow path and the feed flow path counter to the membrane flow path and reducing a temperature drop along the membrane flow path compared to an arrangement with a feed flow path concurrent with the membrane flow path;

compensating for at least a portion of the temperature drop in the gas separation membrane due to enthalpy of gas separation; and supplying the retentate, which contains nitrogen-enriched air, to a fuel tank on board the aircraft.

10. The method of claim 9 further comprising flowing the air feed along another feed flow path directionally from the product end to the feed end of the gas separation membrane, the other feed flow path being separated from the feed flow path, the air feed in the other feed flow path contacting the housing and, thereafter, flowing inside the hollow fiber membranes along the membrane flow path, and the other feed flow path being counter to the membrane flow path.

11. The method of claim 9 wherein exchanging heat between the membrane flow path and the feed flow path counter to the membrane flow path increases a separation efficiency of the gas separation module compared to an arrangement with a feed flow path concurrent with the membrane flow path.

12. The method of claim 9 wherein compensating for at least a portion of the temperature drop comprises establishing a temperature of the product end of the gas separation membrane that is within 10° F. of a temperature of the feed end of the gas separation membrane.

13. The method of claim 10 wherein the housing comprises an inner shell and an outer shell, the gas separation membrane is within the inner shell, and flowing the air feed along the other feed flow path comprises flowing the air feed along a passage between the inner shell and the outer shell.

14. The method of claim 9 wherein flowing the air feed along the feed flow path comprises flowing the air feed along a plurality of separated flow paths.

15. The method of claim 9 wherein the gas separation module comprises a feed tubesheet within the housing securing the feed end of the plurality of hollow fiber membranes and a product tubesheet within the housing securing the product end of the plurality of hollow fiber membranes, and the method further comprises:
- segregating the air feed and the permeate exterior side of the plurality of hollow fiber membranes with the feed tubesheet; and
- segregating the permeate exterior side of the plurality of hollow fiber membranes and the retentate with the product tubesheet.

16. The method of claim 10 wherein the other feed flow path comprises a plurality of other feed flow paths separated from each other inside the housing at a periphery of the gas separation membrane and parallel to the feed flow path.

17. The method of claim 12 wherein the compensating for at least a portion of the temperature drop in the gas separation membrane due to enthalpy of gas separation further comprises increasing air feed flow rate compared to when the temperature of the product end is more than 10° F. below the temperature of the feed end and thus increasing uniformity of a temperature profile along the gas separation membrane compared to when the temperature of the product end is more than 10° F. below the temperature of the feed end.

18. A gas separation method comprising:
- using an air separation module of an aircraft fuel tank flammability reduction system, the air separation module including a housing and a gas separation membrane within the housing, the gas separation membrane having a feed end and a product end with a retentate interior side and a permeate exterior side between the feed end and the product end and including a plurality of hollow fiber membranes;
- supplying an air feed into the housing, the air feed containing oxygen gas and nitrogen gas;
- flowing the air feed along a feed flow path within the housing directionally from the product end to the feed end of the gas separation membrane, the feed flow path extending among and being surrounded by the plurality of hollow fiber membranes and the air feed being segregated from contact with the permeate exterior side;
- flowing the air feed along another feed flow path directionally from the product end to the feed end of the gas separation membrane, the other feed flow path being separated from the feed flow path, the air feed in the other feed flow path contacting the housing;
- after the feed flow path, flowing the air feed from the feed flow path and the other feed flow path inside the hollow fiber membranes along a membrane flow path defined by the gas separation membrane from the feed end to the product end of the gas separation membrane, the feed flow path and the other feed flow path being counter to the membrane flow path;
- contacting the retentate interior side with the air feed in the membrane flow path, permeating at least some of the oxygen gas from the air feed through the air separation membrane to the permeate exterior side, and producing retentate that is enriched in the nitrogen gas as a result of removing at least some of the oxygen gas from the air feed;
- exchanging heat between the membrane flow path and the feed flow path counter to the membrane flow path and reducing a temperature drop along the membrane flow path compared to an arrangement with a feed flow path concurrent with the membrane flow path;
- providing a configuration for the air separation module, selecting one or more process conditions, and, as a result, establishing a temperature of the product end of the gas separation membrane that is within 10° F. of a temperature of the feed end of the gas separation membrane, the established temperature of the product end increasing a separation efficiency of the air separation module compared to when the temperature of the product end is more than 10° F. below the temperature of the feed end; and
- supplying the retentate, which contains nitrogen-enriched air, to a fuel tank on board the aircraft.

19. The method of claim 18 wherein the housing comprises an inner shell and an outer shell, the gas separation membrane is within the inner shell, and flowing the air feed along the other feed flow path comprises flowing the air feed along a passage between the inner shell and the outer shell.

20. The method of claim 18 wherein the other feed flow path comprises a plurality of other feed flow paths separated from each other inside the housing at a periphery of the gas separation membrane and parallel to the feed flow path.

* * * * *